(12) United States Patent
Halladay

(10) Patent No.: US 8,709,195 B2
(45) Date of Patent: Apr. 29, 2014

(54) POWDERED PRIMER FOR RUBBER TO METAL BONDING

(75) Inventor: James R. Halladay, Erie, PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 13/127,768

(22) PCT Filed: Nov. 9, 2009

(86) PCT No.: PCT/US2009/063686
§ 371 (c)(1),
(2), (4) Date: May 5, 2011

(87) PCT Pub. No.: WO2010/054287
PCT Pub. Date: May 14, 2010

(65) Prior Publication Data
US 2011/0209822 A1    Sep. 1, 2011

Related U.S. Application Data

(60) Provisional application No. 61/112,211, filed on Nov. 7, 2008.

(51) Int. Cl.
*B32B 37/24*    (2006.01)
*B32B 15/06*    (2006.01)

(52) U.S. Cl.
USPC ........... 156/283; 156/320; 156/327; 428/462; 428/465

(58) Field of Classification Search
USPC .................. 156/283, 320, 335, 327; 427/328; 428/462, 465, 466
See application file for complete search history.

(56) References Cited

U.S. PATENT DOCUMENTS

| | | | |
|---|---|---|---|
| 2,514,195 A | 7/1950 | Kuhn | |
| 3,928,111 A * | 12/1975 | Baird ............................ | 156/315 |
| 3,998,992 A | 12/1976 | Nakamura | |
| 4,079,168 A | 3/1978 | Schwemmer et al. | |
| 4,172,912 A | 10/1979 | Noji et al. | |
| 4,211,824 A | 7/1980 | Yoshida | |
| 4,552,605 A | 11/1985 | Itoh et al. | |
| 5,030,515 A * | 7/1991 | Ozawa et al. .................. | 428/416 |
| 5,102,956 A * | 4/1992 | Holmes-Farley ............. | 525/285 |
| 5,200,459 A * | 4/1993 | Weih et al. .................... | 524/459 |
| 5,268,404 A | 12/1993 | Mowrey | |
| 5,492,963 A | 2/1996 | Ozawa et al. | |
| 5,539,043 A | 7/1996 | Kimura et al. | |
| 6,136,732 A | 10/2000 | Patel | |
| 6,174,569 B1 * | 1/2001 | Blomer et al. ................ | 427/410 |
| 6,292,995 B1 | 9/2001 | Corbin et al. | |
| 6,713,183 B2 * | 3/2004 | Araki et al. ................... | 428/421 |
| 6,723,778 B2 | 4/2004 | Kucera et al. | |
| 6,841,600 B2 | 1/2005 | Green et al. | |
| 6,878,231 B2 | 4/2005 | Mowrey et al. | |
| 6,893,590 B1 | 5/2005 | Rigosi et al. | |
| 7,456,241 B2 | 11/2008 | McFaddin et al. | |
| 2004/0265504 A1 | 12/2004 | Magnin et al. | |
| 2006/0014900 A1 | 1/2006 | McFaddin et al. | |
| 2007/0243372 A1 | 10/2007 | Mowrey | |

FOREIGN PATENT DOCUMENTS

| | | |
|---|---|---|
| CA | 783026 | 4/1968 |
| CN | 1069025 A | 5/2007 |
| DE | 3834879 A1 | 4/1990 |
| DE | 4017499 | 6/1992 |
| EP | 0422392 A | 4/1991 |
| EP | 0633301 A | 11/1995 |
| EP | 0832915 A | 4/1998 |
| JP | 60-215088 A | 10/1985 |
| JP | 60-217283 A | 10/1985 |
| JP | 61040343 | 2/1986 |
| JP | 01-095177 A | 4/1989 |
| JP | 01154742 | 6/1989 |
| JP | 03-230950 A | 10/1991 |
| JP | 2005097405 | 4/2005 |
| JP | 2006233056 | 9/2006 |
| WO | 94/07968 A1 | 4/1994 |
| WO | 2006007438 A | 1/2006 |
| WO | 2008/147955 A1 | 12/2008 |

OTHER PUBLICATIONS

Standard Test Methods for Rubber Property—Adhesion to Rigid Substrates, ASTM International, Designation D 429-03, pp. 4-22.
Zhang Jianwei, Cai Ming, Study on New Adhesive for Bonding Rubber to Metal, Journal of Engineering Plastics Application, No. 2, vol. 24, 1996, pp. 12-14.

* cited by examiner

*Primary Examiner* — Scott W Dodds
(74) *Attorney, Agent, or Firm* — Todd W. Galinski

(57) ABSTRACT

A powder primer composition particularly useful as a primer intended to be used in conjunction with an adhesive topcoat in rubber to metal bonding. And a method for bonding an elastomeric substrate to a metallic substrate comprising, applying a powder primer composition onto one of said substrates, wherein the powder primer composition comprises a rubbery polymer and at least one of a phenolic resin and a phenoxy resin, applying an adhesive covercoat to form a coated substrate, contacting the coated substrate with the other of said substrates, and heating the contacted substrates to effect bonding of the metallic substrate to the elastomer.

19 Claims, No Drawings

POWDERED PRIMER FOR RUBBER TO METAL BONDING

CROSS-REFERENCE TO RELATED APPLICATIONS

The present application claims priority under 35 U.S.C. §119(e) from U.S. Provisional Patent Application Ser. No. 61/112,211, filed Nov. 7, 2008, entitled "POWDERED PRIMER FOR RUBBER TO METAL BONDING", the disclosure of which is incorporated herein by reference.

FIELD OF THE INVENTION

The present invention relates to powdered primers or coatings, particularly a powdered primer for bonding elastomers to various substrates. More particularly, the present invention relates to powdered primers for use with topcoat adhesives for bonding vulcanizable elastomers to substrates, particularly metallic substrates.

BACKGROUND OF THE INVENTION

Primers are often used as an undercoat in combination with a covercoat adhesive in order to achieve superior bonding between two substrates made from different materials. One particular application for such primers is in bonding elastomers to metal surfaces. Elastomer-to-metal bonding is subjected to severe environmental conditions in many industrial and automotive assemblies. For example, many engine mounting assemblies that employ elastomer-to-metal bonding contain fluids in order to assist in damping of vibration of the engine. These fluid-filled engine mounting devices are being exposed to increasingly high temperatures such that the elastomer-to-metal adhesive bonds within the mounts are being exposed to very high temperature fluid environments. Many elastomer-to-metal assemblies, particularly those utilized in automobile applications, are routinely exposed to materials that contain corrosive salts or other corrosive materials that may act to degrade the elastomer-to-metal adhesive bond.

In order to provide acceptable bonding, adhesive compositions must exhibit excellent primary bonding defined as retention of rubber on the substrate after bond destruction, adequate sweep resistance i.e., ability of the uncured adhesive coating on the substrate to remain undisturbed against the force of injected green rubber into a mold cavity, good storage stability of the adhesive and durable adhesion under extreme environmental conditions, typically measured by the hot tear test (such as ASTM D-429) the stressed boiling water test (well known in the industry), and salt spray tests (such as ASTM B-117-97).

In light of the increasing regulations regarding volatile organic compounds (VOC), the use of traditional solvent-borne adhesives is becoming more problematic. Consequently, there is significant ongoing work to develop water-borne replacements. For example, aqueous or water-borne primers are known and described in U.S. Pat. Nos. 5,200,455 and 5,162,156, but they have various shortcomings compared to solvent-borne primers. For example, it is desirable to improve the environmental resistance performance of aqueous elastomer-to-metal adhesion primers that include polyvinyl alcohol-stabilized phenolic resin dispersions (see U.S. Pat. No. 5,200,455) when used with certain important adhesive covercoats. Elastomer-to-metal primers that include phenolic resins derived from water soluble phenolic precursors are also known (see U.S. Pat. No. 5,162,156) but these suffer from drawbacks that prevent their use to form robust, environmentally resistant films. Before being thermoset, films formed from water soluble phenolic resins tend to re-solvate when exposed to water. Often this source of water is an aqueous covercoat applied to the primer film. Application of the aqueous covercoat essentially washes away the film formed from the water soluble phenolic resin. In addition, such films exhibit very limited resistance to corrosive fluids.

Another problem associated with the bonding of elastomer to metal relates to pre-heating or pre-baking of the dried adhesive prior to bonding. The metal substrate typically is coated with the adhesive, the adhesive is dried and then the adhesive-coated metal substrate is placed in a mold. Elastomer then is introduced into the mold and bonded to the metal substrate during vulcanization of the elastomer. The bonded part is removed from the mold and the next metal substrate is placed in the mold. When this subsequent metal substrate is placed in the mold it is subjected to the heat retained in the mold from the previous molding operation. The dried adhesive must be able to withstand this retained heat (referred to herein as "pre-heating") prior to bonding.

Consequently, there exists a continuing need for a primer that provides robust adhesive bonding in hot, corrosive environments, has an affinity for a broad range of covercoats, and forms a flexible film that is resistant to pre-heating conditions and exhibits superior shelf-life stability and resistance to resolvation. It would be especially advantageous if such a primer could also be used as a coating for protecting a metallic surface.

SUMMARY OF THE INVENTION

In a first aspect of the present invention, a powder composition is provided. The powder composition is particularly useful as a primer composition intended to be used in conjunction with an adhesive topcoat. In another embodiment of the present invention, the powder composition is employed as a coating for metal or other substrates. In a preferred embodiment of the present invention, the adhesive topcoat additionally comprises a powdered composition, but it could also comprise either a water-based or solvent-based composition. In an additional embodiment of the present invention, the primer composition may be employed for bonding without a topcoat, particularly for bonding certain rubbers, particularly those that are peroxide cured.

Thus, a primer for use in bonding metal to elastomers is provided which does not employ solvents and as such is delivered to a substrate substantially free of water or other liquids, while forming environmentally durable bonds. Further, the powder primer compositions of the present invention comprise materials which are shelf stable and do not alter their bonding properties during storage, yet can flow sufficiently to be sprayable and are sinterable at higher temperatures.

In a first aspect of the present invention, a method for bonding an elastomeric substrate to a metallic substrate comprising, applying a powder primer composition onto one of said substrates, wherein the powder primer composition comprises a rubbery polymer and at least one of a phenolic resin and a phenoxy resin, and applying an adhesive covercoat to form a coated substrate, contacting the coated substrate with the other of said substrates, and heating the contacted substrates to effect bonding of the metallic substrate to the elastomer.

In some embodiments of the present invention, the powder primer composition comprises from about 30 to about 80 weight percent of the at least one of a phenolic resin and a phenoxy resin, and from about 5 to about 35 weight percent of the rubbery polymer.

In another embodiment of the present invention, the powder primer composition further comprises a metal oxide, preferably zinc oxide.

In an embodiment of the present invention, the at least one of a phenolic resin and a phenoxy resin comprises a resole, and in another embodiment the at least one of a phenolic resin and a phenoxy resin comprises a novolak.

In an additional embodiment of the present invention, the powder primer composition further comprises a phenolic curative, preferably at least one of hexamethylene tetramine and hexamethoxymethylmelamine.

In a further embodiment of the present invention, the rubbery polymer comprises at least one of nitrile butadiene rubber (NBR), hydrogenated nitrile rubber (HNBR), chlorosulfonated polyethylene (CSM), chlorinated polyethylene (CPE), chlorinated natural rubber, chlorinated styrene butadiene rubber, trans-poly(octenamer), polychloroprene (CR), carboxylated versions of nitrile or hydrogenated nitrile rubber, and halogenated polyolefins such as poly(DCD), brominated poly(DCD), copolymers of poly(DCD) with alpha-bromoacrylonitrile, and hexachlorocyclopentadiene adducted polybutadiene.

In one preferred embodiment of the present invention, the rubbery polymer comprises a butadiene polymer. In another embodiment of the present invention, the rubbery polymer comprises a 90:10 to 95:5 copolymer of dichlorobutadiene and alpha-bromoacrylonitrile.

In a further embodiment of the present invention, the powder primer is applied by electrostatic spraying. In another embodiment of the present invention, the coated substrate comprises a metallic substrate and the other of said substrates comprises an elastomer.

In yet another embodiment of the present invention, the adhesive covercoat comprises a powder covercoat adhesive. In an alternate embodiment of the present invention, the adhesive covercoat comprises a solvent-based covercoat adhesive. In a further alternate embodiment of the present invention, the adhesive covercoat comprises an aqueous-based covercoat.

In an additional embodiment of the present invention, during the step of heating the contacted substrates, the contacted substrates are headed under pressure.

In a further embodiment of the present invention, the powder primer is applied to the metallic substrate and sintered prior to application of the adhesive covercoat. In another embodiment of the present invention, the powder primer is applied to the metallic substrate, then a powder adhesive covercoat is applied over the primer, then both powder coats are sintered prior to bonding the coated substrate to the other of said substrates.

DETAILED DESCRIPTION OF THE INVENTION

While powdered coatings have replaced solvent and water-based coatings in many applications in the powder coating industry, these coatings do not possess the robustness and environmental resistance characteristics, which are necessary for a rubber-to-metal adhesive as discussed above. The compositions of the present invention overcome these limitations of the prior art.

In one embodiment of the present invention, the powdered composition comprises 30 to 80 percent by weight of at least one of a phenolic resin and a phenoxy resin, 5 to 35 percent by weight of a rubbery polymer component, wherein the amount of rubbery polymer component is less than the amount of the at least one phenolic and phenoxy resin. Optional additional constituents may be added comprising curatives, adhesion promoters, corrosion inhibitors, and fillers.

In a further embodiment of the present invention, the curatives, adhesion promoters and corrosion inhibitors comprise from about 1 to about 30 percent by weight. In another embodiment of the present invention, the particulate fillers comprise from about 0 to about 25 percent by weight.

In one embodiment of the present invention, it is believed that the phenolic and/or phenoxy resins are critical to achieve adhesion of the composition to a metal surface.

In an embodiment of the present invention comprising a phenolic resin, the phenolic resin useful in the composition may be any resole or novolak or a combination thereof. In one preferred embodiment of the present invention, the phenolic resin generally comprises an alkylated thermosetting phenolic resin. In the most preferred embodiment, the phenolic resin comprises an alkylated phenolic novolak.

In an embodiment of the present invention employing a phenoxy resin, the phenoxy resin comprises any phenoxy resin such as any commercially available phenoxy resin such as Paphen® phenoxy resin sold by Phenoxy Associates. When phenoxy resin and a phenolic resin are provided in the composition, heat provided during the curing process in the bonding of an elastomeric material to a substrate with the compositions enables the crosslinking of the phenoxy resin by the phenolic resin.

In one embodiment of the present invention, the phenolic and/or phenoxy resin comprises from about 30 to about 80 weight percent of the composition. In a most preferred embodiment of the present invention, the phenolic and/or phenoxy resin comprises from about 40 to about 60 weight percent of the composition.

The phenolic resin can be cured to form a highly crosslinked thermoset through known curing methods for phenolic resins. The curing mechanism can vary depending upon the use and form of the phenolic resin. For example, curing of a resole embodiment typically can be accomplished by subjecting the phenolic resin to heat. Curing of the novolak embodiment typically can be accomplished by addition of an aldehyde donor compound. One advantage of the powdered compositions of the various embodiments of the present invention is the ability to formulate the curative in the powdered formulation and initiating cure only when the components are sintered together.

The aldehyde donor can essentially be any type of aldehyde known to react with hydroxy aromatic compounds to form cured or crosslinked novolak phenolic resins, and is compatible with a powder composition. Typical compounds useful as an aldehyde (e.g., formaldehyde) source in the present invention include formaldehyde, formalin; acetaldehyde; propionaldehyde; isobutyraldehyde; 2-ethylhexyldehyde; 2-methylpentaldehyde; 2-ethylhexyldehyde; benzaldehyde; as well as compounds which decompose to formaldehyde, such as paraformaldehyde, trioxane, furfural, benzoxazines and Mannich bases, hexamethylenetetramine, hexamethoxymethylmelamine (HMMM), anhydromaldehydeaniline, ethylene diamine formaldehyde; acetals which liberate formaldehyde on heating; methylol derivatives of urea and formaldehyde; methylol phenolic compounds; and the like.

It is believed that the rubbery polymer component anchors the resin and prevents the composition from sweeping or wiping from the metal when it melts during molding cycle of the rubber. The rubbery polymer also improves the compatibility between the primer and the adhesive covercoat, thus preventing intercoat delamination.

In one embodiment of the present invention, the rubbery polymer component comprises a solid at room temperature. Preferably the rubbery polymer is chosen to allow a shelf-stable composition which is flowable and/or sprayable at normal application temperatures. The rubbery polymer component is sinterable at a temperature lower than the ultimate cure temperature of the elastomer to be bonded to allow for a sintering step in which the powder composition is sintered, and the constituents mix and react to form a thermosetting composition.

In one embodiment of the present invention, the preferred rubbery polymer component comprises at least one of nitrile butadiene rubber (NBR), hydrogenated nitrile rubber (HNBR), chlorosulfonated polyethylene (CSM), chlorinated polyethylene (CPE), chlorinated natural rubber, chlorinated styrene butadiene rubber, trans-poly(octenamer), polychloroprene (CR), carboxylated versions of nitrile or hydrogenated nitrile rubber, and halogenated polyolefins such as poly (DCD), brominated poly(DCD), copolymers of poly(DCD) with alpha-bromoacrylonitrile ($\alpha$-BrAN), and hexachlorocyclopentadiene (HEX) adducted polybutadiene.

In one embodiment of the present invention, the rubbery polymer component comprises from about 5 to about 35 weight percent of the composition, however the amount of rubbery polymer component should not exceed the total amount of phenolic and/or phenoxy resin. In a preferred embodiment of the present invention, the rubbery polymer component comprises from about 10 to about 25 weight percent of the composition.

In an additional embodiment of the present invention, an adhesion promoter is employed to enhance adhesion to a substrate. Preferred adhesion promoters comprise diisocyanates, polyisocyanates, epoxy resins, and/or epoxy-phenolic resins which are known and commercially available. Another suitable adhesion promoter is a maleimide compound. Maleimide adhesion promoters include any of the maleimide, bis- or poly-maleimide and related compounds such as are described in U.S. Pat. Nos. 2,444,536 and 2,462,835, incorporated by reference. The maleimide compound used herein may be an aliphatic or aromatic polymaleimide and must contain at least two maleimide groups.

Another adhesion promoter, acting also as an acid acceptor is the class of epoxy resins. Preferred epoxy resins are polyglycidyl polyethers of polyhydric phenols. These phenolic-epoxy resins are complex polymeric reaction products of polyhydric phenols with polyfunctional halohydrins and/or glycerol dichlorohydrin. The products thus obtained contain terminal epoxy groups.

In one embodiment of the present invention, the composition further comprises a metal oxide. Preferred metal oxides include zinc oxide, magnesium oxide, lead oxide, iron oxide, cadmium oxide, zirconium oxide and calcium oxide, with zinc oxide and magnesium oxide being preferred. When employed the metal oxide comprises up to 25 weight percent of the composition. In a preferred embodiment of the present invention, the metal oxide comprises about 3 to about 10 weight percent of the composition.

In additional embodiments of the present invention, other conventional additives include inert filler material, pigments, plasticizers, reinforcing agents and the like in amounts conventionally utilized. Examples of such conventional additives include carbon black, silica, sodium aluminosilicate, titanium dioxide and organic pigments and dyestuffs.

The powder adhesive may be made by various processes including preparation of an aqueous or solvent-based composition, then spray drying, freeze drying, precipitation or otherwise evaporating the solvent or aqueous solution followed by grinding, melt processing and subsequent grinding. In a preferred embodiment of the present invention, the composition is mixed in solid for in a Banbury® mixer, single or twin screw extruder. In another embodiment of the present invention, the composition is mixed in any equipment suitable for melt mixing solid powders, followed by a grinding step. The grinding step may be performed at room temperature or at cryogenic temperatures to enhance the processability of the powder. Additionally, in a preferred embodiment of the present invention, the powder is mixed/processed below the melting point of the constituents of the powder so as to keep the individual components of the powder unreacted until the powder is applied and sintered and/or cured.

Depending upon the application technique, the particle size of the powder should be controlled. Generally, if the particle size is too large, problems arise with fluidization during the spray application and regulation or control of the ultimate film thickness. However, depending upon the application, it may be possible to employ powder adhesives with particle sizes greater than the preferred ranged specified herein. In one embodiment of the present invention, the powder adhesive is ground to an average particle size of less than about 70 microns. In a more preferred embodiment of the present invention, the powder adhesive is ground to an average particle size of less than about 30 microns.

The powder compositions of the present invention have been found to be particularly useful for bonding a wide variety of elastomeric materials, including both vulcanized and vulcanizable elastomeric materials to a variety of substrates, particularly to metal substrates. Additionally, the powder primers of the present invention may be employed as a protective coating on a substrate to prevent environmental damage, such as corrosion or weathering of the metal.

In an embodiment of the present invention where the composition is employed as a primer for rubber to metal bonding, an adhesive covercoat may be employed to enhance bond performance. The primer composition typically is applied to the metal surface and then heated to sinter composition. In a preferred embodiment of the present invention, the sintering step will take place at a temperature sufficient to initiate some reaction between the phenolic/phenoxy component and the metal, or partially crosslink the phenolic and/or rubbery polymer component so as to provide a thermoset film on the substrate. This prevents the adhesive composition from sweeping off the substrate during subsequent handling or molding operations.

The covercoat then is applied to the primer-coated metal surface and the coated metal surface and elastomeric surface are brought together under heat and pressure to complete the bonding procedure. If a powdered adhesive covercoat is employed, the coated substrate may be sintered again to provide a shelf-stable handle-able part ready to be bonded. In an alternate embodiment of the present invention, the primer composition is applied to the substrate, then the covercoat is applied directly overtop of the primer without an intermediate sintering step.

The exact conditions selected will depend upon the particular elastomer being bonded and whether or not it is cured prior to bonding. The coated metal surface and the elastomeric surface are typically brought together under a pressure of 20 to 175 MPa, preferably from 20 to 50 MPa. If the elastomer is uncured, the resulting elastomer-metal assembly is simultaneously heated to a temperature of 140° C. to 220° C., preferably 160° C. to 200° C. The assembly should remain under the applied pressure and temperature for a period of 1 minute to 60 minutes, depending on the cure rate and thickness of the elastomeric substrate. If the elastomer is already cured, the bonding temperature may range from 90° C. to above 180° C. for 15 to 120 minutes.

The bonding process may be carried out by introducing the elastomer as a semi-molten material to the metal surface as in, for example, an injection-molding process. The process may also be carried out by utilizing compression molding, transfer molding or autoclave curing techniques. After the process is complete, the bond is fully vulcanized and ready for use in a final application.

The covercoat comprises any polymeric material-adhering adhesive, such as those described in U.S. Pat. Nos. 3,258,389; 4,119,587; 5,200,459; 5,300,555 and 5,496,884. Both solvent-based and aqueous elastomer-to-metal adhesive covercoats are commercially available from Lord Corporation and sold under the trademark Chemlok®. Powdered covercoats are described in U.S. patent application Ser. No. 12/126,175, filed May 23, 2008, entitled "POWDER ADHESIVES FOR BONDING ELASTOMERS", herein incorporated by reference in full.

Elastomers which can be bonded include, without limitation, natural rubber, polychloroprene rubber, styrene-butadiene rubber, nitrile rubber, ethylene/propylene copolymer rubber (EPM); ethylene/propylene/diene terpolymer rubber (EPDM); butyl rubber, polyurethane rubber, PAREL type elastomers, and the like. Other substrates which can be effectively bonded to themselves or to elastomers include fabrics such as fiberglass, polyamides, polyester, aramides, glass, ceramics and the like. Metals and their alloys to which the elastomers can be bonded include steel, stainless steel, titanium, lead, aluminum, copper, brass, bronze, Monel® metals, nickel, zinc, and the like, including treated metals such as phosphatized steel, galvanized steel, and the like.

Thus, there has been outlined, rather broadly, the more important features of the invention in order that the detailed description that follows may be better understood and in order that the present contribution to the art may be better appreciated. There are, obviously, additional features of the invention that will be described hereinafter and which will form the subject matter of the claims appended hereto. In this respect, before explaining several embodiments of the invention in detail, it is to be understood that the invention is not limited in its application to the details and construction and to the arrangement of the components set forth in the following description. The invention is capable of other embodiments and of being practiced and carried out in various ways.

It is also to be understood that the phraseology and terminology herein are for the purposes of description and should not be regarded as limiting in any respect. Those skilled in the art will appreciate the concepts upon which this disclosure is based and that it may readily be utilized as the basis for designating other structures, methods and systems for carrying out the several purposes of this development. It is important that the claims be regarded as including such equivalent constructions insofar as they do not depart from the spirit and scope of the present invention.

EXAMPLES

Examples 1-5

Examples 1 through 5 show the use of different rubbers and different curatives:

|  | Example 1 | Ex 2 | Ex 3 | Ex 4 | Ex 5 |
|---|---|---|---|---|---|
| Nitrile Butadiene Rubber | 10 | 10 | 10 | 10 | 10 |
| Chlorosulfonated polyethylene | 10 | 10 | 10 | — | — |
| Trans-poly(octenamer) | — | — | — | 10 | — |
| poly(DCD/α-BrAN) | — | — | — | — | 10 |
| Magnesium oxide | 4 | 4 | 3 | 3 | 3 |
| Zinc oxide | 4 | 4 | 3 | 3 | 3 |
| Phenolic resin blend | 45 | 64 | 50 | 50 | 50 |
| Hexamethoxymethylmelamine | 27 | — | 22 | 22 | 22 |
| Hexamethylenetetramine | — | 8 | 1.5 | 1.5 | 1.5 |
| Carbon black (for color) | — | — | 0.5 | 0.5 | 0.5 |

Examples 1-5 were tested on zinc phosphatized steel coupons (ASTM D429 method B coupons). The composition was spray applied with an electrostatic sprayer and sintered for 6 minutes at 320° F. A topcoat poly(DCD/α-BrAN) was applied and sintered for 10 minutes at 290° F. The coated coupons were then bonded to 55 durometer sulfur-cured natural rubber compound A135P, and cured for 15 minutes at 320° F. Results measured by a primary bond test as well as a stressed boiling water test where the coupons are immersed in boiling water while under a 2 Kg load applied with hanging weights:

|  | Example 1 | Ex 2 | Ex 3 | Ex 4 | Ex 5 |
|---|---|---|---|---|---|
| Primary bond (psi) | 72 | 73 | 75 | 71 | 67 |
| Boiling water resistance (hours to failure) | 1.6 | 2 | >6 | >6 | >6 |

Examples 6-9

Examples 6 through 9 showing different phenolic resins and different metal oxides along with an example of rubber effect:

|  | Example 6 | Ex 7 | Ex 8 | Ex 9 |
|---|---|---|---|---|
| Nitrile Butadiene Rubber | 15 | 15 | 15 | 10 |
| Trans-poly(octenamer) | 5 | 5 | 5 | — |
| Chlorosulfonated polyethylene | — | — | — | 10 |
| Magnesium oxide | 3 | — | 6 | 3 |
| Zinc oxide | 3 | 6 | — | 3 |
| Phenolic novolak resin | 48 | 48 | 48 | 48 |
| Hexamethoxymethylmelamine | 22 | 22 | 22 | 22 |
| Phenylene bis-maleimide | 2 | 2 | 2 | 2 |
| Hexamethylenetetramine | 1.5 | 1.5 | 1.5 | 1.5 |
| Carbon black | 0.5 | 0.5 | 0.5 | 0.5 |

Examples 6-9 were tested on zinc phosphatized steel coupons. The composition was spray applied with an electrostatic sprayer and sintered for 6 minutes at 320° F. A topcoat of poly(DCD/α-BrAN) was applied and sintered for 10 minutes at 290° F. The coated coupons were then bonded to 55 durometer sulfur-cured natural rubber compound A135P, and cured for 15 minutes at 320° F.

|  | Example 6 | Ex 7 | Ex 8 | Ex 9 |
|---|---|---|---|---|
| Primary bond (psi) | 68 | 76 | 50 | 86 |
| Boiling water resistance (minutes to failure) | 12 | 240 | <1 | >360 |

Examples 10-13

Examples 10 through 13 illustrate the effectiveness of the primer composition on cold rolled steel coupons (not phosphatized). They demonstrate that the choice of resins makes a significant difference and that phenoxy resins are useful in the blend.

|  | Example 10 | Ex 11 | Ex 12 | Ex 13 |
|---|---|---|---|---|
| Nitrile Butadiene Rubber | 10 | 10 | 10 | 10 |
| Trans-poly(octenamer) | 10 | 10 | 10 | 10 |
| Zinc oxide | 6 | 6 | 6 | 6 |
| Unmodified phenolic novolak | 48 | 24 | 24 | 24 |
| Modified phenolic novolak | — | 24 | — | — |
| Phenolic resole | — | — | 24 | — |
| Phenoxy resin PKHB | — | — | — | 24 |
| Hexamethoxymethylmelamine | 22 | 22 | 22 | 22 |
| Phenylene bis-maleimide | 2 | 2 | 2 | 2 |
| Hexamethylenetetramine | 1.5 | 1.5 | 1.5 | 1.5 |
| Carbon black (for color) | 0.5 | 0.5 | 0.5 | 0.5 |

Examples 10-13 were tested on cold rolled steel coupons. The composition was spray applied with an electrostatic sprayer and sintered for 6 minutes at 320° F. A topcoat of poly(DCD/α-BrAN) was applied and sintered for 10 minutes at 290° F. The coated coupons were then bonded to 55 durometer sulfur-cured natural rubber compound A135P, and cured for 15 minutes at 320° F.

|  | Example 10 | Ex 11 | Ex 12 | Ex 13 |
|---|---|---|---|---|
| Primary bond (psi) | 38 | 56 | 58 | 70 |
| Boiling water resistance (minutes to failure) | 8 | >300 | >300 | >300 |

Examples 14-15

Examples 14 and 15 show that using a Diels-Alder adduct of hexachlorocyclopentadiene on polybutadiene as part of the rubbery polymer component can increase the hot tear strength of bonded natural rubber.

|  | Example 14 | Ex 15 |
|---|---|---|
| Nipol 1052-30 (NBR) | 10 | 10 |
| Trans-poly(octenamer) | 10 | — |
| HEX adducted butadiene | — | 10 |
| Zinc oxide | 6 | 6 |
| Unmodified phenolic novolak | 35 | 35 |
| Phenolic resole | 12 | 12 |
| Hexamethoxymethylmelamine | 20 | 20 |
| Phenylene bis-maleimide | 2 | 2 |
| Hexamethylenetetramine | 3.0 | 3.0 |
| Carbon black (for color) | 2.0 | 2.0 |

Examples 14-15 were tested on cold rolled steel coupons. The composition was spray applied with an electrostatic sprayer and sintered for 6 minutes at 320° F. A topcoat of poly(DCD/α-BrAN) was applied and sintered for 7 minutes at 320° F. The coated coupons were then bonded to 30 durometer sulfur-cured natural rubber compound HC130, and cured for 21 minutes at 300° F.

|  | Example 14 | Ex 15 |
|---|---|---|
| Primary bond (psi) | 50 | 51 |
| Hot Tear | Fair | Excellent |
| Boiling water resistance (minutes to failure) | >120 | >120 |

What is claimed is:

1. A method for bonding an elastomeric substrate to a metallic substrate comprising:
    applying a powder primer composition onto the metallic substrate, wherein the powder primer composition comprises a rubbery polymer and at least one of a phenolic resin and a phenoxy resin;
    applying an adhesive covercoat to the primed metallic substrate to form a coated substrate;
    contacting the coated substrate with a vulcanizable elastomeric substrate; and,
    heating the contacted substrates to effect bonding of the metallic substrate to the elastomeric substrate.

2. The method of claim 1, wherein the powder primer composition comprises from about 30 to about 80 weight percent of the at least one of a phenolic resin and a phenoxy resin.

3. The method of claim 1, wherein the powder primer composition comprises from about 5 to about 35 weight percent of the rubbery polymer.

4. The method of claim 1, wherein the powder primer composition further comprises a metal oxide.

5. The method of claim 4, wherein the metal oxide comprises zinc oxide.

6. The method of claim 1, wherein the at least one of a phenolic resin and a phenoxy resin comprises a resole.

7. The method of claim 1, wherein the at least one of a phenolic resin and a phenoxy resin comprises a novolak.

8. The method of claim 7, wherein the powder primer composition further comprises a phenolic curative.

9. The powder composition of claim 8, wherein the phenolic curative comprises at least one of hexamethylene tetramine and hexamethoxymethylmelamine.

10. The method of claim 1, wherein the rubbery polymer comprises at least one of nitrile butadiene rubber (NBR), hydrogenated nitrile rubber (HNBR), chlorosulfonated polyethylene (CSM), chlorinated polyethylene (CPE), chlorinated natural rubber, chlorinated styrene butadiene rubber, trans-poly(octenamer), polychloroprene (CR), carboxylated versions of nitrile or hydrogenated nitrile rubber, and halogenated polyolefins such as poly(DCD), brominated poly (DCD), copolymers of poly(DCD) with alpha-bromoacrylonitrile, and hexachlorocyclopentadiene adducted polybutadiene.

11. The method of claim 1, wherein the rubbery polymer comprises a butadiene polymer.

12. The method of claim 1, wherein the rubbery polymer comprises a 90:10 to 95:5 copolymer of dichlorobutadiene and alpha-bromoacrylonitrile.

13. The method of claim 1, wherein the powder primer is applied by electrostatic spraying.

14. The method of claim 1, wherein the adhesive covercoat comprises a powder covercoat adhesive.

15. The method of claim 1, wherein the adhesive covercoat comprises a solvent-based covercoat adhesive.

16. The method of claim 1, wherein the adhesive covercoat comprises an aqueous-based covercoat.

17. The method of claim 1, wherein during the step of heating the contacted substrates, the contacted substrates are heated under pressure.

18. The method of claim 1, wherein the powder primer is applied to the metallic substrate and sintered prior to application of the adhesive covercoat.

19. The method of claim 1, wherein the powder primer is applied to the metallic substrate, then a powder adhesive covercoat is applied over the primer, then both powder coats are sintered prior to bonding the coated substrate to the other of said substrates.

* * * * *